United States Patent
Sanghvi

(10) Patent No.: US 10,671,315 B2
(45) Date of Patent: Jun. 2, 2020

(54) BLOCKCHAIN ARCHITECTURE FOR SELECTIVE DATA RESTORE AND MIGRATION

(71) Applicant: BANK OF AMERICA CORPORATION, Charlotte, NC (US)

(72) Inventor: Siten Sanghvi, Jersey City, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 70 days.

(21) Appl. No.: 16/104,687

(22) Filed: Aug. 17, 2018

(65) Prior Publication Data
US 2020/0057565 A1 Feb. 20, 2020

(51) Int. Cl.
G06F 3/00 (2006.01)
G06F 3/06 (2006.01)
G06F 16/22 (2019.01)

(52) U.S. Cl.
CPC ............ *G06F 3/065* (2013.01); *G06F 3/0619* (2013.01); *G06F 3/0673* (2013.01); *G06F 16/2255* (2019.01)

(58) Field of Classification Search
CPC .............................. G06F 3/065; G06F 16/2255
USPC ......................................................... 711/165
See application file for complete search history.

(56) References Cited

U.S. PATENT DOCUMENTS

| | | |
|---|---|---|
| 7,013,290 B2 | 3/2006 | Ananian |
| 8,777,735 B1 | 7/2014 | Fine et al. |
| 8,838,545 B2 | 9/2014 | Tevis et al. |
| 9,063,898 B1 | 6/2015 | Merchant et al. |
| 9,483,357 B2 | 11/2016 | Karonde et al. |
| 9,501,368 B2 | 11/2016 | Beatty et al. |
| 9,558,072 B1 | 1/2017 | Mam |
| 9,608,829 B2 | 3/2017 | Spanos et al. |
| 10,261,846 B1 | 4/2019 | Patton et al. |
| 10,474,563 B1 | 11/2019 | Rai et al. |
| 10,489,864 B1 | 11/2019 | Werr |
| 2003/0191916 A1* | 10/2003 | McBrearty .......... G06F 11/1464 711/162 |

(Continued)

OTHER PUBLICATIONS

T. T. A. Dinh, R. Liu, M. Zhang, G. Chen, B. C. Ooi and J. Wang, "Untangling Blockchain: A Data Processing View of Blockchain Systems," in IEEE Transactions on Knowledge and Data Engineering, vol. 30, No. 7, pp. 1366-1385, Jul. 1, 2018. (Year: 2018).

*Primary Examiner* — Jae U Yu
(74) *Attorney, Agent, or Firm* — Michael A. Springs; Moore & Van Allen PLLC; Nicholas C. Russell

(57) ABSTRACT

A system, computer program product, and computer-implemented method for selective restore utilizing a blockchain architecture are provided. Embodiments comprise a controller assigned for selectively copying and reconstructing system data stored on a blockchain, the controller comprising at least one memory device with computer-readable program code stored thereon, at least one communication device connected to a network, and at least one processing device. The at least one processing device is configured to execute the computer-readable program code to: establish a connection to a blockchain within a source environment, the blockchain storing system data; selectively clone a section of the blockchain from the source environment; and reconstruct the section of the blockchain in a target environment.

18 Claims, 9 Drawing Sheets

(56) References Cited

U.S. PATENT DOCUMENTS

| | | |
|---|---|---|
| 2010/0257513 A1 | 10/2010 | Thirumalai et al. |
| 2011/0296384 A1 | 12/2011 | Pasternak |
| 2012/0101886 A1 | 4/2012 | Subramanian et al. |
| 2013/0044106 A1 | 2/2013 | Shuster et al. |
| 2014/0310243 A1 | 10/2014 | McGee et al. |
| 2014/0344015 A1 | 11/2014 | Purtolas-Montas et al. |
| 2014/0349750 A1 | 11/2014 | Thompson et al. |
| 2015/0170112 A1 | 6/2015 | DeCastro |
| 2015/0227890 A1 | 8/2015 | Bednarek et al. |
| 2015/0375117 A1 | 12/2015 | Thompson et al. |
| 2016/0012465 A1 | 1/2016 | Sharp |
| 2016/0085955 A1 | 3/2016 | Lerner |
| 2016/0253710 A1 | 9/2016 | Publicover et al. |
| 2016/0275461 A1 | 9/2016 | Sprague et al. |
| 2016/0321654 A1 | 11/2016 | Lesavich et al. |
| 2017/0116693 A1 | 4/2017 | Rae et al. |
| 2017/0173262 A1 | 6/2017 | Veltz |
| 2017/0206523 A1 | 7/2017 | Goeringer et al. |
| 2017/0221029 A1 | 8/2017 | Lund et al. |
| 2017/0337534 A1 | 11/2017 | Goeringer et al. |
| 2017/0346693 A1 | 11/2017 | Dix et al. |
| 2018/0041571 A1 | 2/2018 | Rogers et al. |
| 2018/0052813 A1 | 2/2018 | Laupretre et al. |
| 2018/0096175 A1 | 4/2018 | Schmeling et al. |
| 2018/0157825 A1 | 6/2018 | Eksten et al. |
| 2018/0165184 A1 | 6/2018 | Cochran et al. |
| 2018/0343111 A1 | 11/2018 | Chen et al. |
| 2018/0352268 A1 | 12/2018 | O'Hanlon et al. |
| 2018/0365686 A1 | 12/2018 | Kondo |
| 2019/0028278 A1 | 1/2019 | Gilson |
| 2019/0065709 A1 | 2/2019 | Salomon |
| 2019/0065733 A1 | 2/2019 | Forehand |
| 2019/0081793 A1 | 3/2019 | Martino et al. |
| 2019/0123892 A1 | 4/2019 | Basu |
| 2019/0130114 A1 | 5/2019 | Smith et al. |
| 2019/0132212 A1 | 5/2019 | Freund et al. |
| 2019/0132350 A1 | 5/2019 | Smith et al. |
| 2019/0149600 A1 | 5/2019 | Duan et al. |
| 2019/0190697 A1 | 6/2019 | Cunico et al. |
| 2019/0229893 A1 | 7/2019 | Nenov et al. |
| 2019/0266334 A1* | 8/2019 | Robison ................ G06F 21/566 |
| 2019/0303621 A1 | 10/2019 | Baset et al. |
| 2019/0354614 A1 | 11/2019 | Chui et al. |
| 2019/0356674 A1 | 11/2019 | Irazabal et al. |
| 2019/0361992 A1 | 11/2019 | Kaguma et al. |
| 2019/0370250 A1 | 12/2019 | Tipton et al. |
| 2019/0372834 A1 | 12/2019 | Patil et al. |
| 2019/0379543 A1 | 12/2019 | Sethi et al. |
| 2019/0384587 A1 | 12/2019 | Rao et al. |

* cited by examiner

BLOCKCHAIN ARCHITECTURE FOR SELECTIVE DATA RESTORE AND MIGRATION

BACKGROUND

Many entities are required to routinely clone or transfer data from one system to another and use the cloned system for coding, testing and/or quality assurance. However, due to sometimes excessively large and constantly growing data sources, system cloning is not performed as often as recommended due to data size and length transfer times. As a result, there exists a need for a new system restore and copy technology that overcomes the challenges of traditional system restore, data copy and/or cloning methods.

Meanwhile, blockchain is a growing, highly-adaptive new technology already being implemented across multiple industries. Due its unique characteristics and inherent advantages, the blockchain structure may provide benefits to several technologies that utilize data storage and restore as described herein especially for large systems that require significant time and effort for cloning data.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the following address these and/or other needs by providing an innovative system, method and computer program product for implementing a decentralized blockchain regulation architecture. The invention may be exampled by a system which defines a specific embodiment of the invention. A system for selective system restore utilizing a blockchain architecture is provided. The system comprises a controller assigned for selectively copying and reconstructing system data stored on a blockchain, the controller comprising at least one memory device with computer-readable program code stored thereon, at least one communication device connected to a network, and at least one processing device, wherein the at least one processing device is configured to execute the computer-readable program code to: establish a connection to a blockchain within a source environment, the blockchain storing system data; selectively clone a section of the blockchain from the source system; and reconstruct the section of the blockchain in a target system.

In some embodiments, the system data comprises multiple data types, wherein the at least one processing device is further configured to execute the computer-readable program code to: generate separate hashes for each of the multiple data types, wherein data from the system is bucketed in a block on the blockchain based on a data type of the data; and modify the block header of the block on the blockchain to individually store the separate hashes.

In some embodiments, the blockchain has a number of sequential blocks, wherein selectively cloning the section of the blockchain further comprises: assigning an endblock value for the section, wherein the endblock value designates a maximum number of the sequential blocks to be reconstructed in the target environment.

In some embodiments, assigning the endblock value further comprises assigning a first endblock value for a first data type and a second endblock value for a second data type, wherein the section comprises reconstructed data designated by the first endblock value and the second endblock value.

In some embodiments, the blockchain is a first blockchain, wherein the at least one processing device is further configured to execute the computer-readable program code to add an incremental block to the section in the target system, the section and the incremental block forming a second blockchain.

In some embodiments, the at least one processing device is further configured to execute the computer-readable program code to rebroadcast the incremental block from the second chain in the target system to the first blockchain in the source system, wherein the incremental block is added as a new block to the end of the first blockchain. In another embodiment, block content data is rebroadcast to the first blockchain, wherein a new block header is generated for the new block on the first blockchain.

In some embodiments, the at least one processing device is further configured to execute the computer-readable program code to trim the incremental block that are not part of the source system from the second blockchain in the target system to restore the section.

In some embodiments, the section is a first section, wherein the at least one processing device is further configured to execute the computer-readable program code to: selectively clone a second section of the blockchain from the source environment; and reconstruct a combined third section of the blockchain, wherein the combined third section comprises the first section and the second section.

In some embodiments, the source system is a production environment and the target environment is a copy of production system used for testing, quality assurance, or product development.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
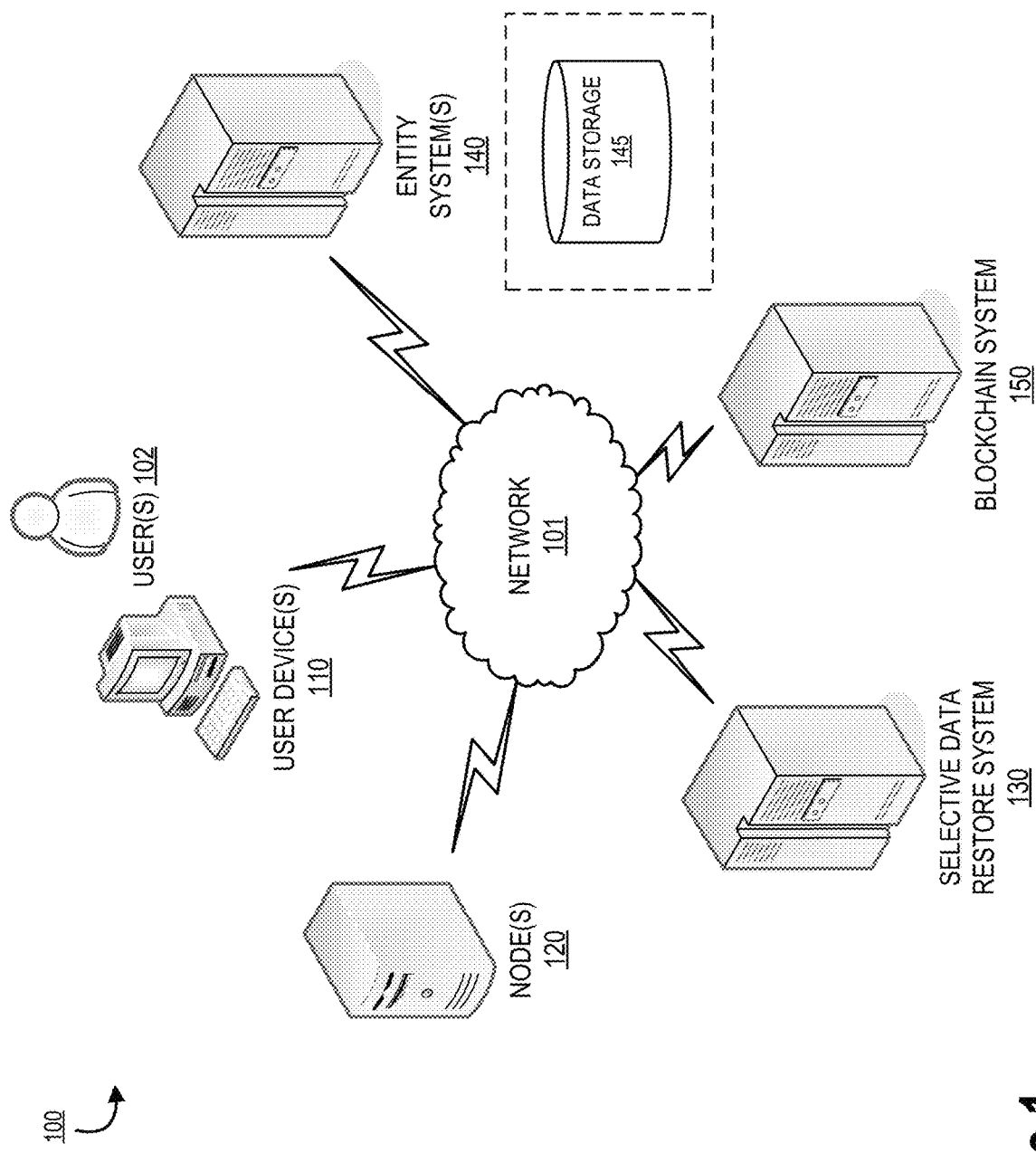
Figure 2:
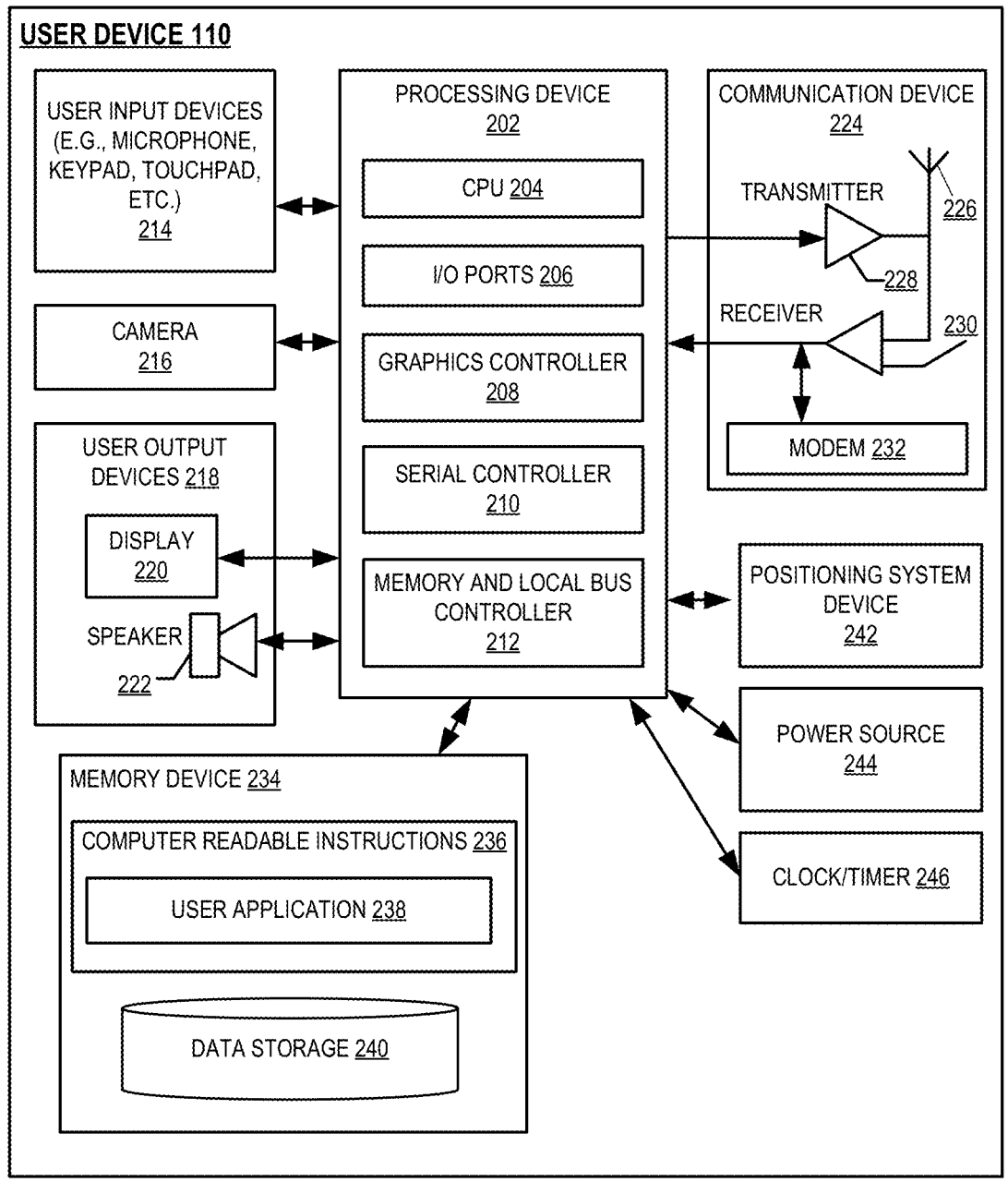
Figure 3:
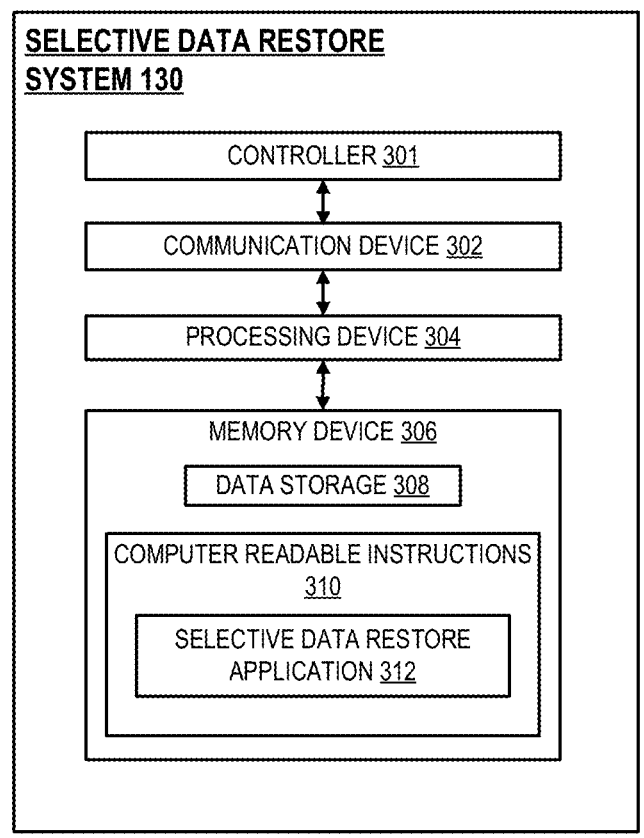
Figure 4A:
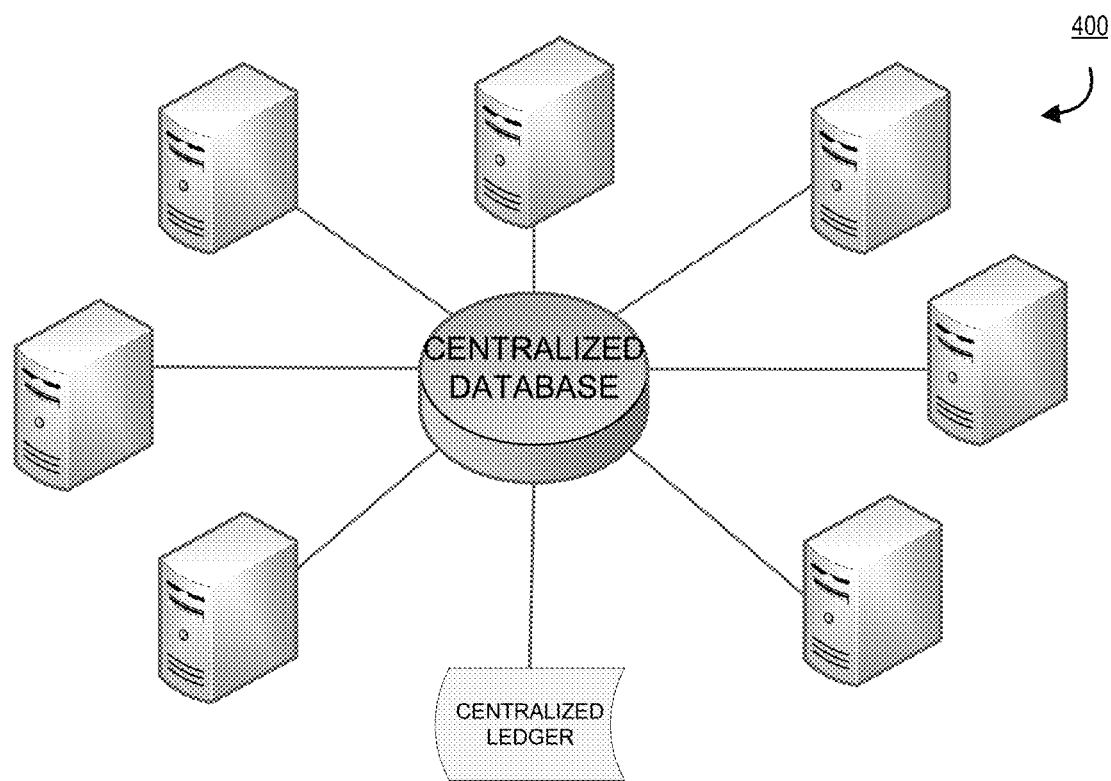
Figure 4B:
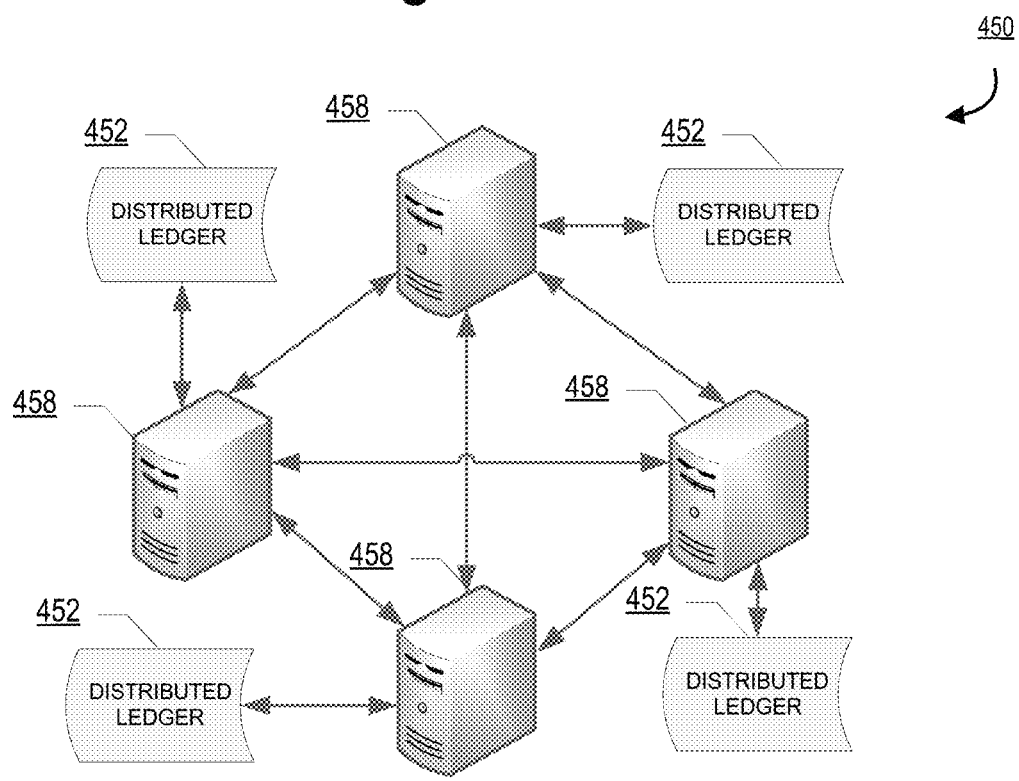
Figure 5:
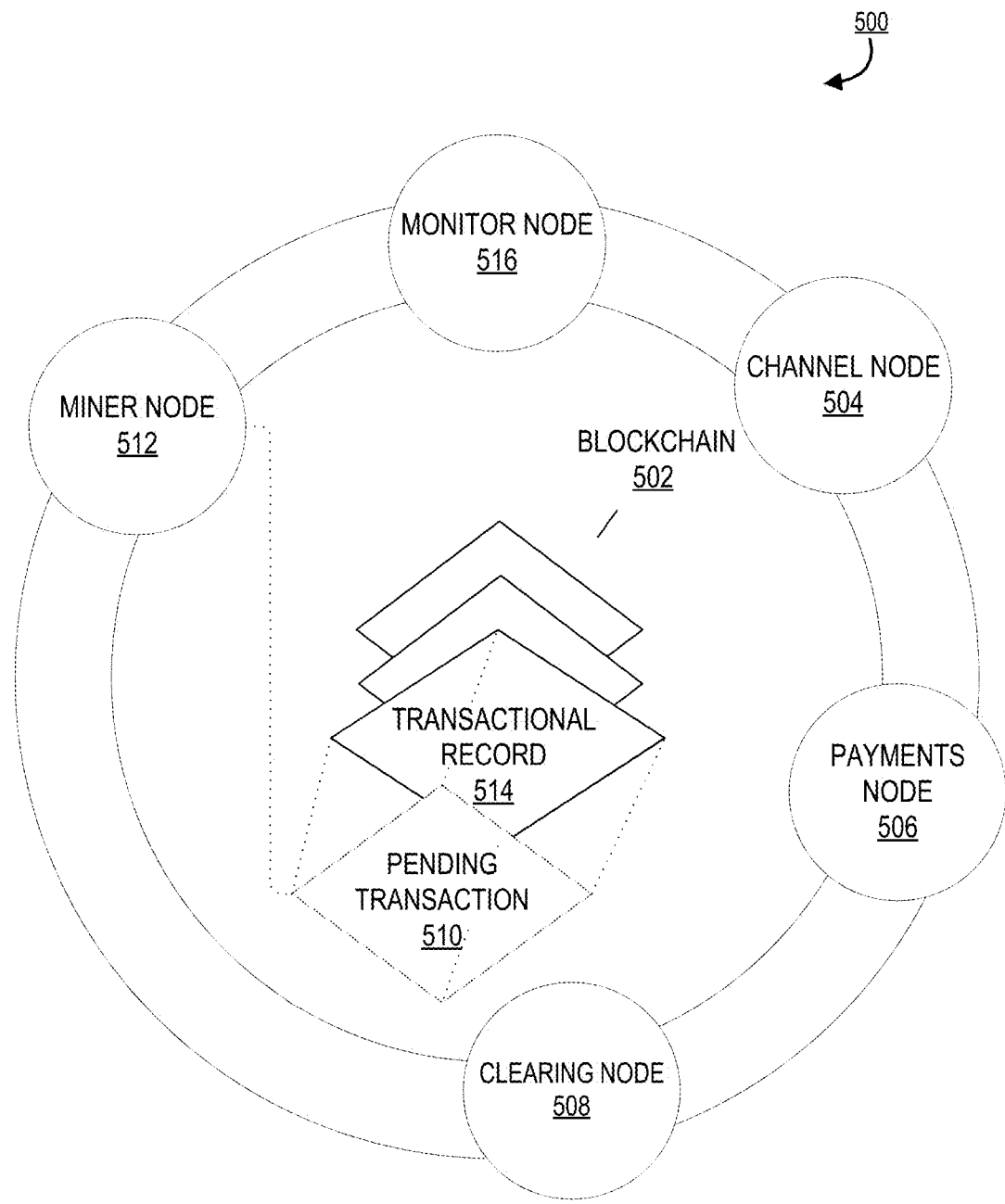
Figure 6:
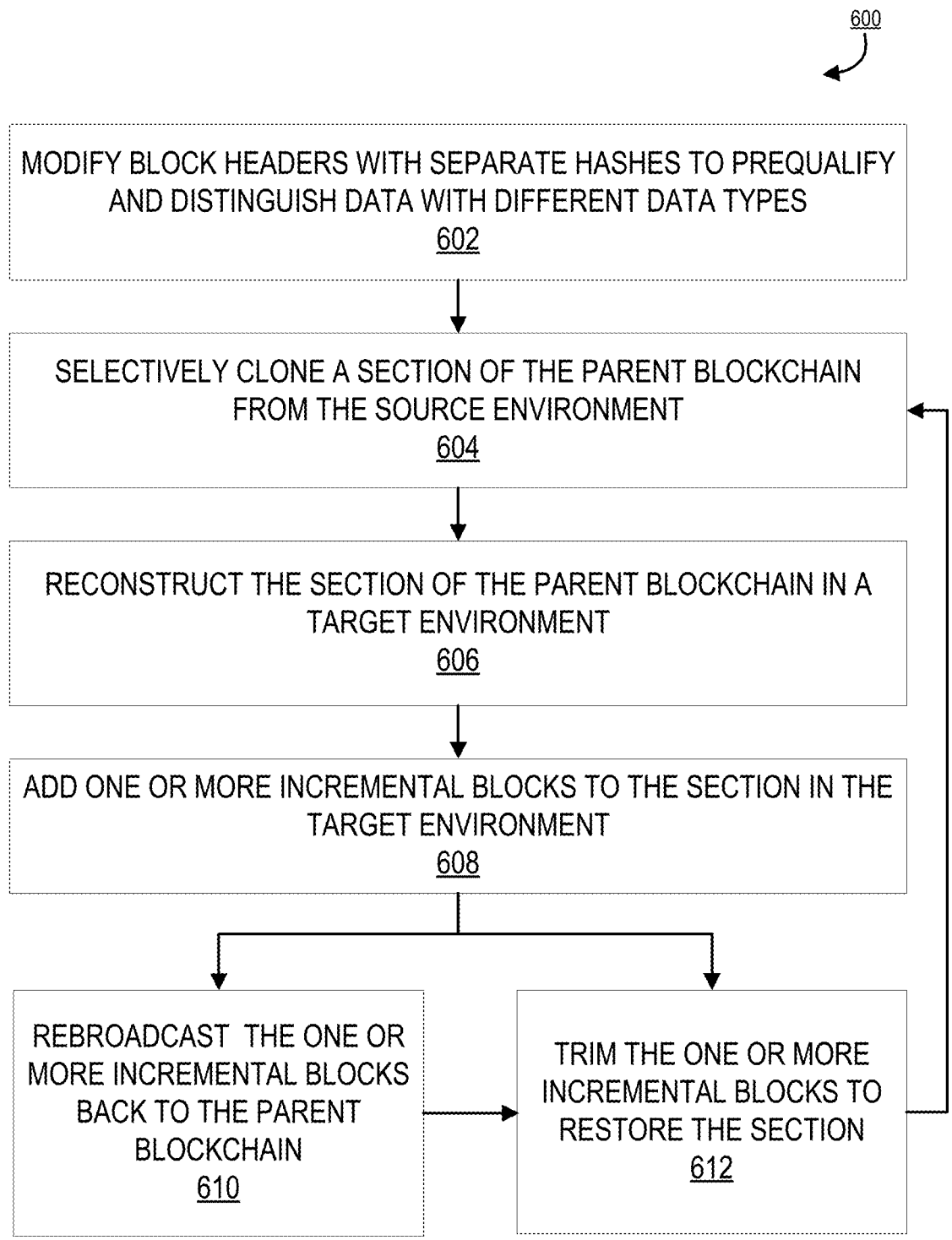
Figure 7:
Figure 8:
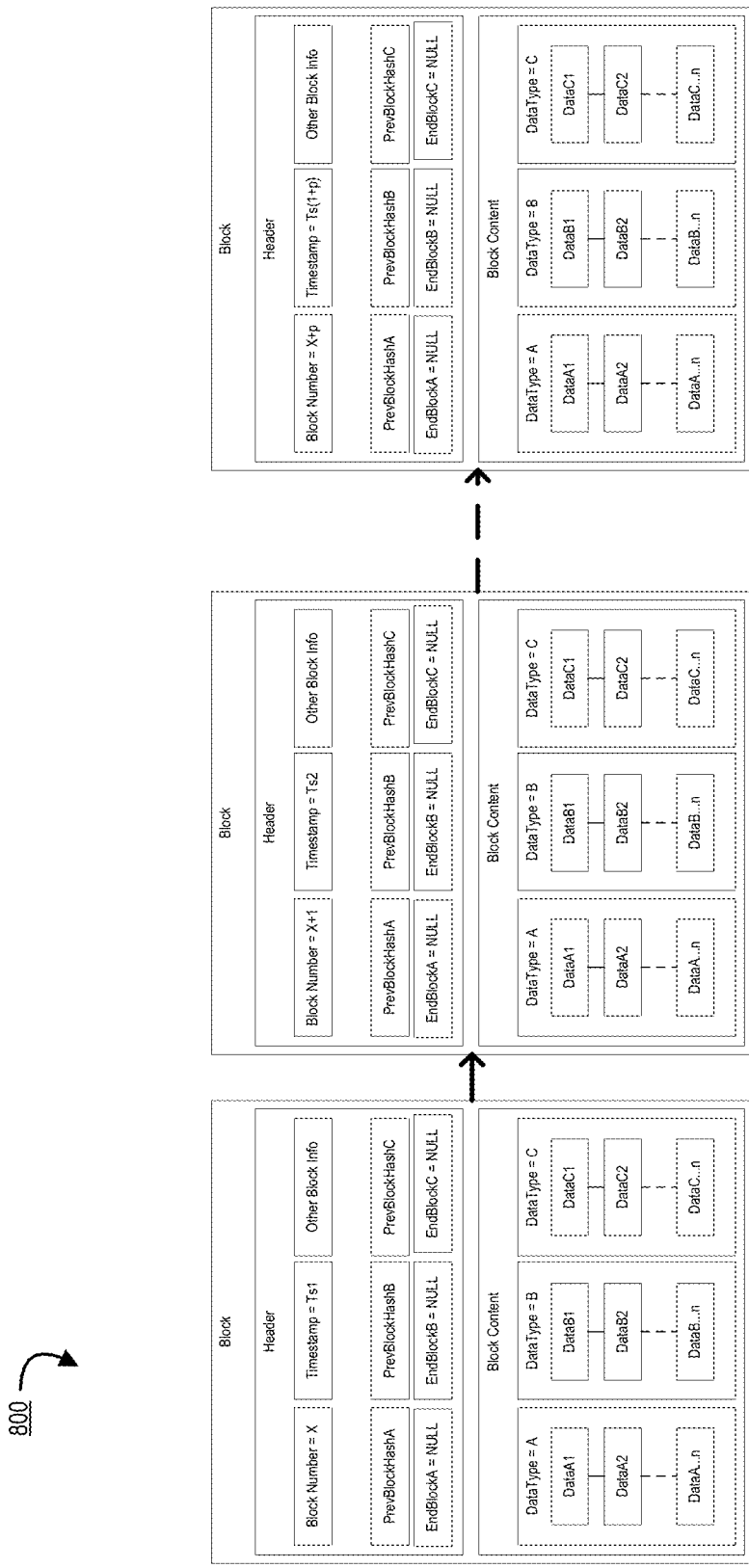
Figure 9:
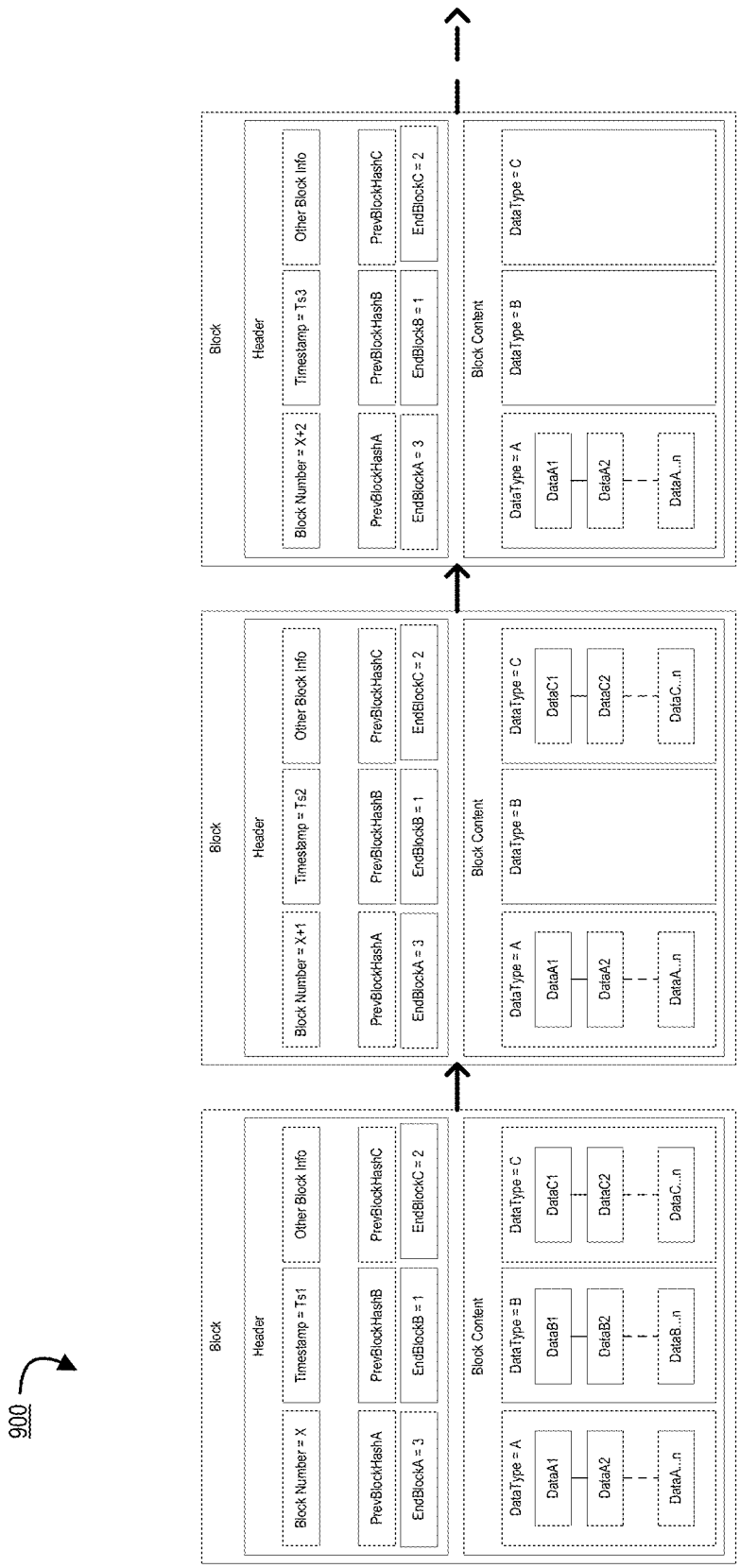

Having thus described embodiments of the invention in general terms, reference will now be made to the accompanying drawings, wherein:

FIG. 1 provides a selective data migration system environment, in accordance with one embodiment of the invention;

FIG. 2 provides a block diagram of a user device, in accordance with one embodiment of the invention;

FIG. 3 provides a block diagram of selective data restore system, in accordance with one embodiment of the invention;

FIG. 4A provides a centralized system architecture, in accordance with one embodiment of the invention;

FIG. 4B provides a high level blockchain system architecture, in accordance with one embodiment of the invention;

FIG. 5 provides a high level process flow illustrating node interaction within a blockchain system architecture, in accordance with one embodiment of the invention;

FIG. 6 provides a process map for selective data migration, in accordance with one embodiment of the invention;

FIG. 7 provides a block diagram illustrating an exemplary selective data restore map, in accordance with one embodiment of the invention;

FIG. 8 provides a portion of a parent blockchain, in accordance with one embodiment of the invention; and FIG. 9 provides a portion of a selectively copied and reconstructed blockchain, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. In some embodiments, a device may refer to an entity's computer system, platform, servers, databases, networked devices, or the like. The device may be used by the user to access the system directly or through an application, online portal, internet browser, virtual private network, or other connection channel. The device may be a computer device within a network of connected computer devices that share one or more network storage locations.

As used herein, the term "computing resource" or "computing hardware" may be used to refer to elements of one or more computing devices, networks, or the like available to be used in the execution of tasks or processes. A computing resource may include processor, memory, or network bandwidth and/or power used for the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison or nodes of a blockchain).

A "user" as used herein may refer to any entity or individual associated with the selective data restore system. In some embodiments, a user may be a computing device user, a mobile device application user, a system operator, database manager, a support technician, and/or employee of an entity. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

In accordance with embodiments of the invention, the term "entity" may be used to include any organization or collection of users that may interact with the selective data restore system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module (such as the robotic process automation module and/or the entity platform described herein) may monitor a user input into the system. In further embodiments, the system may store said user input during an interaction in order to substantially replicate said user input at another time.

As used herein, a "connection" or an "interaction" may refer to any communication between one or more users, one or more entities or institutions, and/or one or more devices, nodes, chains, or systems within the system environment described herein. For example, an interaction may refer to a transfer of data between systems or devices, an accessing of stored data by one or more devices, a transmission of a requested task, a migration or backup off data between environments, or the like.

The terms "blockchain," or "distributed ledger," as used herein, refer to a decentralized electronic ledger of data records which are authenticated by a federated consensus protocol. Multiple computer systems within the blockchain, referred to herein as "nodes" or "compute nodes," each comprise a copy of the entire ledger of records. Nodes may write a data "block" to the blockchain, the block comprising data regarding a transaction, said blocks further comprising data and/or metadata. In some embodiments, only miner nodes may write transactions to the blockchain. In other embodiments, all nodes have the ability to write to the blockchain. In some embodiments, the block may further comprise a time stamp and a pointer to the previous block in the chain (e.g., a "hash"). In some embodiments, the block may further comprise metadata indicating the node that was the originator of the transaction. In this way, the entire record of transactions is not dependent on a single database which may serve as a single point of failure; the blockchain will persist so long as the nodes on the blockchain persist.

A "block" as used herein may refer to one or more records of a file with each record comprising data for transmission to a server. In some embodiments, the term record may be used interchangeably with the term block to refer to one or more transactions or data within a file being transmitted. In particular, the blockchain begins with a genesis block and is subsequently lengthened by incrementally appending blocks in series to the genesis block. Generally, the data within each block within the blockchain may not be modified by the nodes of the blockchain; data may only be added through the addition of a block to the last block in the blockchain. Each block added to the blockchain may comprise a timestamp and a pointer to the previous block in the blockchain (e.g., a "hash"). In this way, the blockchain may provide an immutable record of data records over a period of time. In some embodiments, in order for a new block to be added to the blockchain, a pending data record may be proposed to be added to the blockchain. The nodes may then, via a "consensus algorithm" or "consensus mechanism," come to a consensus as to the contents of the data in the blockchain. Once a consensus has been reached by the nodes that the pending data record is valid, the nodes append the data record to the last block in the blockchain. In this way, each node maintains a validated copy of the blockchain such that the blockchain may remain accessible even if one or more nodes become unavailable (e.g. a node is offline due to maintenance, malfunction, etc.) and may further account for divergence from the true copy of the blockchain which may occur at the node level (e.g. a copy of the blockchain on a particular node becomes invalid due to data corruption, malicious editing, and the like). In other words, the consensus mechanism ensures that, over time, each node hosts a copy of the blockchain that is consistent with the other nodes.

Embodiments of the invention as described herein may utilize one, several, or a combination (i.e. hybrid) of a number of different consensus algorithms to ensure the integrity of the data within the blockchain. In some embodiments, the consensus mechanism may be a "proof of work" ("PoW") algorithm, in which the nodes perform a series of calculations to solve a cryptographic puzzle. For instance, in order to validate a pending data record, the nodes may be required to calculate a hash via a hash algorithm (e.g. SHA256) which satisfies certain conditions set by the system. Calculating a hash in this way may be referred to herein as "mining," and thus a node performing the mining may be referred to as "miners" or "miner nodes."

"Miner node" as used herein refers to a networked computer system or device that authenticates and verifies the integrity of pending transactions on the blockchain. The miner node ensures that the sum of the outputs of the transaction within the block matches the sum of the inputs. In some embodiments, a pending transaction may require validation by a threshold number of miner nodes. Once the threshold number of miners has validated the transaction, the block becomes an authenticated part of the blockchain. By using this method of validating transactions via a federated consensus mechanism, duplicate or erroneous transactions are prevented from becoming part of the accepted blockchain, thus reducing the possibility of data record tampering and increasing the security of the transactions within the system.

Embodiments of the invention provide a technical solution to the problem of large-scale restoration and copying by utilizing blockchain systems in a nonconventional way. Many entities routinely transfer data in a system from a production environment to a lower environment for creating a production copy for product development, testing and/or quality assurance. However, due to excessively large and constantly growing data sources, environment cloning is not performed as often as recommend due to data size requiring lengthy restore times. Currently, for database on the scale of several terabytes, traditional cloning method can take several days to weeks to create a system copy, as the entire database must be cloned for every performed migration even if only a portion of the database is of interest. Due to these excessive transfer times and computing resources that must be dedicated to the lengthy task, system cloning for large environments are sometime only performed once or twice a year.

The system and methods provided herein overcome these problems by provided a selective data restore solution that utilizes and adapts blockchain technology to allow for faster, resource efficient data restoration providing the most recent copy of data needed for product development and/or data testing. The system modifies block headers of blocks storing data of the system on a blockchain to prequalify the data stored thereon allowing for a user to selectively clone only the data that the user desires from the source system blockchain. The system can define an endblock on which the data migration will cease so that the target system can be selectively restored over and over again by appending part of the blockchain to the previously restored blocks thereby eliminating the requirement of copying the entirety of the system every time a user wishes to migrate a portion of the system for testing, quality assurance, product development, or the like. Furthermore, the system retains migrated portions of the system data allowing for the user to build additional copy tasks in the target environment without needing to recopy the previously copied data from the production system again. Furthermore, by modifying the block headers of the blocks on the blockchain to prequalify and sort data into categories, the system improves blockchain technology.

FIG. 1 provides a system that includes specialized systems and devices communicably linked across a distributive network of nodes required to perform the functions of as described herein. FIG. 1 provides a selective data restore system environment 100, in accordance with one embodiment of the present invention. As illustrated in FIG. 1, the selective data restore system 130 is operatively coupled, via a network 101 to the user device 110, nodes 120, the entity system 140, and the blockchain system 150. In this way, the selective data restore system 130 can send information to and receive information from the user device 110, nodes 120, entity system 140, and the blockchain system 150. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual or system that desires to implement the selective data restore system 130 of the present invention over the network 101. In some embodiments a user 102 is a user or entity completing a data migration or copy to between data environments such as from a production environment to different environment for testing, quality assurance, and/or development. In other embodiments, the user 102 is a user or entity managing data storage on the blockchain. In some embodiments, the user 102 has a user device 110 that may control a data restore or copy from a system data storage 145 through interaction with the devices and systems of the environment 100.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like, one or more chips, and the like. The processing device 202 may further include a central processing unit 204, input/output (I/O) port controllers 206, a graphics controller or GPU 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with content provided from an entity. In some embodiments, the user application 238 further includes a client for managing, copying, and/or editing data stored on the blockchain such as data stored in system data storage 145 of the entity system or another system. The user application 238 may also allow the user to view and manipulate data and perform actions on the blockchain as described herein.

The processing device 202 may be configured to use the communication device 224 to communicate with one or more other devices on a network 101 such as, but not limited to the selective data restore system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes an entity system 140 (as illustrated in FIG. 1) which is connected to the user device 110, the nodes 120, the selective data restore system 130, and the blockchain system 150. In some embodiments, the entity system 140 may be associated with one or more financial institutions or financial entities. While only one entity system 140 is illustrated in FIG. 1, it is understood that multiple network systems may make up the system environment 100. The entity system 140 generally comprises a communication device, a processing device, and a memory device. The entity system 140 comprises computer-readable instructions stored in the memory device, which in one embodiment includes the computer-readable instructions of an entity application. The financial entity system 140 may communicate with the user device 110, the nodes 120, the selective data restore system 130, and the blockchain system 150 to, for example, complete transactions on the blockchain. As illustrated in FIG. 1, the entity system 140 may comprise system data storage 145 for storing data such as files, programming code, transactional records, and/or other data.

The nodes 120, and the blockchain system 150 may comprise the same or similar features as the entity system 140. In some embodiments, the nodes 120 may be user devices 110 forming a plurality of networked devices participating in a blockchain environment forming a decentralized ledger which may be accessed via the blockchain system 150.

FIG. 3 provides a block diagram of the selective data restore system 130, in accordance with one embodiment of the invention. The selective data restore system 130 generally comprises a controller 301, a communication device 302, a processing device 304, and a memory device 306.

As used herein, the term "controller" generally refers to a hardware device and/or software program that controls and manages the various systems described herein such as the user device 110, the nodes 120, the selective data restore system 130, the entity system 140, and/or the blockchain system 150, in order to interface and manage data flow between systems while executing commands. In some embodiments, the controller may be integrated into one or more of the systems described herein. In some embodiments, the controller may perform one or more of the processes, actions, or commands described herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110, the nodes 120, the entity system 140, and the blockchain system 150. As such, the communication device 302 generally comprises a modem, server, or other device for communicating with other devices on the network 101.

As further illustrated in FIG. 3, the selective data restore system 130 comprises computer-readable instructions 310 stored in the memory device 306, which in one embodiment includes the computer-readable instructions 310 of a selective data restore application 312. In some embodiments, the memory device 306 includes data storage 308 for storing data related to the system environment, but not limited to data created and/or used by the selective data restore application 312.

Embodiments of the selective data restore system 130 may include multiple systems, servers, computers or the like maintained by one or many entities. FIG. 3 merely illustrates one of those systems that, typically, interacts with many other similar systems to form the blockchain. The functions of the selective data restore system 130 will be described in more detail herein. In some embodiments, the selective data restore system 130 is part of the entity system 140. In other embodiments, the entity system 140 is distinct from the selective data restore system 130. The selective data restore system 130 may communicate with the entity system 140 via a secure connection generated for secure encrypted communications between the two systems.

In one embodiment of the selective data restore system 130 the memory device 306 stores, but is not limited to, a selective data restore application 312. In one embodiment of the invention, both the selective data restore application 312 and/or the controller 301 may associate with applications having computer-executable program code that instructs the processing device 304 to operate the network communication device 302 to perform certain communication functions involving described herein. In one embodiment, the computer-executable program code of an application associated with the controller 301 and/or selective data restore application 312 may also instruct the processing device 304 to perform certain logic, data processing, and data storing functions of the application.

In some embodiments, the controller 301 instructs the processing device 304 to execute a data restore from a system data storage 145 of the entity system 140 from a production environment to a lower environment for testing, quality assurance, and/or product development.

FIG. 4A illustrates a centralized database architecture environment 400, in accordance with one embodiment of the present invention. The centralized database architecture comprises multiple nodes from one or more sources and converge into a centralized database. The system, in this embodiment, may generate a single centralized ledger for data received from the various nodes. FIG. 4B provides a general blockchain system environment architecture 450, in accordance with one embodiment of the present invention. Rather than utilizing a centralized database of data for instrument conversion, as discussed above in FIG. 4A, various embodiments of the invention may use a decentralized blockchain configuration or architecture as shown in FIG. 4B.

A blockchain is a distributed database that maintains a list of data blocks, such as real-time resource availability associated with one or more accounts or the like, the security of which is enhanced by the distributed nature of the blockchain. A blockchain typically includes several nodes, which may be one or more systems, machines, computers, databases, data stores or the like operably connected with one another. In some cases, each of the nodes or multiple nodes are maintained by different entities. A blockchain typically works without a central repository or single administrator. One well-known application of a blockchain is the public ledger of transactions for cryptocurrencies. The data blocks recorded in the blockchain are enforced cryptographically and stored on the nodes of the blockchain.

A blockchain provides numerous advantages over traditional databases. A large number of nodes of a blockchain may reach a consensus regarding the validity of a transaction contained on the transaction ledger. As such, the status of the instrument and the resources associated therewith can be validated and cleared by one participant.

The blockchain system typically has two primary types of records. The first type is the transaction type, which consists of the actual data stored in the blockchain. The second type is the block type, which are records that confirm when and in what sequence certain transactions became recorded as part of the blockchain. Transactions are created by participants using the blockchain in its normal course of business, for example, when someone sends cryptocurrency to another person, and blocks are created by users known as "miners" who use specialized software/equipment to create blocks. In some embodiments, the blockchain system is closed, as such the number of miners in the current system are known and the system comprises primary sponsors that generate and create the new blocks of the system. As such, any block may be worked on by a primary sponsor. Users of the blockchain create transactions that are passed around to various nodes of the blockchain. A "valid" transaction is one that can be validated based on a set of rules that are defined by the particular system implementing the blockchain. For example, in the case of cryptocurrencies, a valid transaction is one that is digitally signed, spent from a valid digital wallet and, in some cases that meets other criteria.

As mentioned above and referring to FIG. 4B, a blockchain system 450 is typically decentralized—meaning that a distributed ledger 452 (i.e., a decentralized ledger) is maintained on multiple nodes 458 of the blockchain 450. One node in the blockchain may have a complete or partial copy of the entire ledger or set of transactions and/or blocks on the blockchain. Transactions are initiated at a node of a blockchain and communicated to the various nodes of the blockchain. Any of the nodes can validate a transaction, add the transaction to its copy of the blockchain, and/or broadcast the transaction, its validation (in the form of a block) and/or other data to other nodes. This other data may include time-stamping, such as is used in cryptocurrency blockchains. In some embodiments, the nodes 458 of the system might be financial institutions that function as gateways for other financial institutions. For example, a credit union might hold the account, but access the distributed system through a sponsor node.

Various other specific-purpose implementations of blockchains have been developed. These include distributed domain name management, decentralized crowd-funding, synchronous/asynchronous communication, decentralized real-time ride sharing and even a general purpose deployment of decentralized applications. While the exemplary blockchain of FIG. 4B is discussed as recording records of transactions (i.e., cryptocurrency exchanges), it should be understood that other data may be stored on the block chain such as files, programming code, configuration files, or any other data type.

FIG. 5 provides a high level process flow illustrating node interaction within a blockchain system environment architecture 500, in accordance with one embodiment of the present invention. As illustrated and discussed above, the blockchain system may comprise at least one or more nodes used to generate blocks. The nodes as discussed with respect to FIG. 5 may be the nodes 120 of the system environment 100 discussed in FIG. 1. In some embodiments, the channel node 504, payments node 506, monitor node 516 or the clearing node 508 may publish a pending transaction 510 (or any interaction (e.g., file edit, migration, upload, or the like)) to the blockchain 502. At this stage, the transaction has not yet been validated by the miner node(s) 512, and the other nodes will delay executing their designated processes. The miner node 512 may be configured to detect a pending transaction 510. Upon verifying the integrity of the data in the pending transaction 510, the miner node 512 validates the transaction and adds the data as a transactional record 514, which is referred to as a block to the blockchain 502. Once a transaction has been authenticated in this manner, the nodes will consider the transactional record 514 to be valid and thereafter execute their designated processes accordingly. The transactional record 514 will provide information about the transaction processed and transmitted through and metadata coded therein for searchability of the transactional record 514 within a distributed ledger. In some embodiments, the system may comprise at least one additional miner node 512. The system may require that pending transactions 510 be validated by a plurality of miner nodes 512 before becoming authenticated blocks on the blockchain.

In some embodiments, the computer systems represent the nodes of the blockchain, such as the miner node 512 or the like. In such an embodiment, each of the computer systems comprise the blockchain, providing for decentralized access to the blockchain as well as the ability to use a consensus mechanism to verify the integrity of the data therein. In some embodiments, an upstream system and a downstream system are further operatively connected to the computer systems and each other through the network. The upstream system further comprises a ledger and the blockchain. The downstream system further comprises the blockchain and an internal ledger, which in turn comprises a copy of the ledger.

In some embodiments, a copy of blockchain may be stored on a durable storage medium within the computer systems or the upstream system or the downstream system. In some embodiments, the durable storage medium may be RAM. In some embodiments, the durable storage medium may be a hard drive or flash drive within the system.

FIG. 6 provides a process map for selectively migrating data blocks 600, in accordance with one embodiment of the invention. Initially, the system establishes a connection to a blockchain storing a distributed record of a database over a network (e.g., network 101). Data stored in the system or database may include files, transaction data, configuration data, programming code, or the like. In some embodiments, the blockchain is a parent blockchain operating within a source environment. In one embodiment, the source environment is a production environment wherein software or another product is put into operation for intended use by end users. In one example, data is stored on a parent chain within a production environment, wherein the data is actively used software.

The system uniquely stores data within the blocks of the blockchain by bucketing or grouping the data into predefined data categories, wherein data of different data types may be distinguishable from one another by the system. Data types are distinguishable groupings or categories of like data. Different data types may include, for example, transaction data, configuration data, different file types, and the like. In a specific example of data types, a user's personal files may be grouped into different data types such as pictures, documents, videos, etc.

As illustrated in the block 602, the system is able to store and distinguish data of different data types from one another by modifying block headers of the blocks on a blockchain with separate hashes which are used to define data types of data stored therein and prequalify said data with distinguishable data types allowing for bucketing of data based on the data types. The system generates the separate data hashes and records them in the block header of each block. For example, as illustrated in embodiment of FIG. 8, each block is recorded with separate hashes (e.g., "PrevBlockHashA") for each data type (i.e., data types A, B, and C) which appropriately groups and distinguishes data of each type from one another.

In some embodiments, the present system is configured to define any number of separate buckets for any number of data types. Buckets are predefined by the system and/or user before the blockchain is built. In contrast, conventional blockchain technology typically only employs a single hash for all data, wherein data of different data types is not separately bucketed. In one embodiment, the system may define a single bucket and hash, wherein the blockchain operates similar to a conventional blockchain coupled with the additional improvements described herein.

As illustrated in block 604, the system receives a migration request to selectively clone at least a section of the parent blockchain from the source environment. A migration request may include, an executed command to migrate, clone, or otherwise copy at least a portion of the parent blockchain (i.e., an incremental section of one or more blocks) from the source environment to a target environment. A target environment is an environment separate from the source environment. In one embodiment, a target environment may include a testing environment, a quality assurance environment, and/or a product development environment. In one embodiment, a migration request may be received by the system from a user via a user device. In another embodiment, migration requests may be scheduled to occur at regular time intervals (e.g., monthly, bi-weekly).

Following cloning of a section of the blockchain, as illustrated in block 606, the section is reconstructed in a second, child blockchain in the target environment. The reconstructed section of the parent blockchain is a copy of one or more incremental blocks from the parent block chain. In this way, the reconstructed section may be used as a restore point or a backup. In another embodiment, the reconstructed section may provide a code base with or without data for developing additional code within a testing environment. For example, in the illustrated embodiment of FIG. 7, the parent blockchain 710 comprises blocks A1-A12. The system builds a first restore 720 by cloning and reconstructing only blocks A1-A4 in the target environment to generate a second, child chain as defined by the system and/or user.

Boundaries of the copied and reconstructed section may be specifying by the system and/or user by, for example, defining a date, time, block number, hash or the like for which to limit the copy process. The system and/or user assigns an endblock value for the section to be copied, wherein the endblock value designates a maximum number of sequential blocks from the parent blockchain to be copied and reconstructed in the target environment (as seen in FIG. 9). The system may compare the assigned endblock value of the desired section to block header values of the blocks of the parent block chain to determine which blocks to copy to the target environment. For example, and endblock value of 3 may be assigned to the section to be reconstructed, wherein the system compares the endblock value of 3 to the block numbers of the blocks of the parent chain. The system determines blocks 1-3 are to be copied and reconstructed as the block numbers are less than or equal to the endblock value of 3. In one embodiment, an empty, blank, or "null" endblock value may indicate that no particular block range is specified and that all data on the blockchain is to be copied.

In another example, a user may specify a particular date and an endblock value for which to limit the data copy, wherein only the blocks in the parent block chain from the genesis of the blockchain to the particular date are copied and reconstructed in the target environment. Unlike conventional copy methods, the presenting system is able to selectively extract particular ranges of blocks containing the system data within the specified time range. In this way, a smaller, targeted data set may be copied as opposed to the entirety allowing for faster, more resource efficient data transfers.

As illustrated in block 608 of FIG. 6, the system may add one or more new, incremental blocks to the reconstructed section in the target environment thereby constructing a new block chain which differs from the parent blockchain in the source environment. The incremental blocks are added to the end of the reconstructed section. For example, in the first restore 720 illustrated in FIG. 7, new blocks B1-B3 are added onto the end of the section A1-A4 to create a new block chain. In one example, the new blocks may comprise new data, code, files, or configurations added into a portion of an existing program or file collection for product development within the target environment, wherein the target environment is a testing, quality assurance, and/or product development environment. In this way, the copied and reconstructed section with the new, incremental blocks may be a new or alternate version of a program or file collection.

As illustrated in block 610 of FIG. 6, the system may rebroadcast the one or more incremental blocks from the target environment back to the parent blockchain in the source environment. As the immutability of the record stored by the parent blockchain may not be corrupted, the one or more incremental blocks are added as new blocks on the end of the parent block chain. Further, in one embodiment, only the block content from the one or more incremental blocks are rebroadcast to the parent chain. The system generates a new block header (i.e., new hash) for incremental blocks rebroadcast and accepted to the parent block chain in order to properly refer to the previous blocks on the parent chain and maintain consistency of the record. In this way, a portion of newly developed or tested data from the target environment may be incorporated into the source environment (e.g., into production). For example, as illustrated in FIG. 7, incremental block B1 of the first restore 720 is rebroadcast to the parent chain 710 in the source environment where block B1 is added to the parent chain 710 as new block A9 to which additional blocks A10-A12 may be added.

Alternative, as illustrated in block 612, the system may trim the one or more incremental blocks from the new blockchain created in the target environment thereby restoring the section that was originally cloned and reconstructed in the target environment. After discarding the trimmed blocks in the target environment, additional incremental blocks may be added in their place. In this way, changes performed on the block chain in the target environment may be reverted which may be convenient in a testing or product development environment. In some embodiments, partially restored blocks with populated endblock values may be trimmed from the target environment to match the original blockchain.

In some embodiments, a second copy function may be performed by the system and/or user. The system and/or user may select a second section of the parent blockchain from the source environment and reconstruct the second section in the target environment. In some embodiments, the second section may comprise the first section already copied and reconstructed in the target environment. Instead of recopying the entirety of the first section while copying the second section, the system may utilize the already copied data of the first section in the target environment and only copy the remaining portions of the second section. The remaining portions of the second section are copied and added to the already copied first section in order to reconstruct the entirety of the requested second section by combining the parts in the target environment. In this way, the system does not need to recopy previously copied portions to the target environment and may conserve computing resources while reducing required data migration times.

Referring now back to FIG. 7, the exemplary embodiment illustrates a second restore 730 comprising blocks A1-A7 built in the target environment. The system builds the second restore 730 by only copying the remaining portion of the second restore (A5-A7) from the parent chain 710 and adding the remaining portion to the end of the blocks A1-A4 which were previously copied to construct the first restore 720. Similar to the first restore 720, the second restore 730 may have new, incremental blocks C1-C4 added to the end of the blockchain created in the second resource 730. Additionally, one or more of the incremental blocks C1-C4 may be rebroadcast back to the parent chain 710 similar to the process described with respect to the first restore 720. For example, in the illustrated embodiment, incremental block C3 is rebroadcast to the parent chain 710 in the source environment, wherein it is add to the end of the parent chain 710 as new block A12. Alternatively, one or more of the incremental blocks C1-C4 may be trimmed from the blockchain of the second restore 730, wherein the second restore 730 is returned to its original state from which additional incremental blocks may be added to create yet another version.

In another embodiment, endblock values may be assigned for different data types, wherein each endblock value designates a maximum block number to be copied and reconstructed for each separate data type. FIG. 8 provides a portion of a parent blockchain from which a second blockchain is reconstructed in FIG. 9 based on the rules defined by the block headers generated by the system. As illustrated in FIG. 8, the parent blockchain 800 comprises a number of sequential blocks comprising data stored as block content having three, separate data types A, B, and C which have been bucketed into three separate groupings according to the individual hashes of the modified block header. FIG. 9 illustrates an executed migration request defining endblock values of 3, 1, and 2 for data types A, B, and C, respectively. As illustrated in FIG. 9, data of type A is copied through block number 3, while copy of data of type B stops after block number 1 and copy of data of type C stops after block number 2. In this way, specific, targeted data may be selectively cloned and reconstructed in the target environment as opposed to traditional methods which would copy over the entirety of the data without bucketing by data type.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with data restoration and blockchain architecture.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for system data restoration utilizing blockchain architecture, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for selective data restore utilizing a blockchain architecture, the system comprising:
a controller assigned for selectively copying and reconstructing data stored on a blockchain, the controller comprising at least one memory device with computer-readable program code stored thereon, at least one communication device connected to a network, and at least one processing device, wherein the at least one processing device is configured to execute the computer-readable program code to:
establish a connection to a blockchain within a source environment, the blockchain storing data and having a number of sequential blocks;
selectively clone a section of the blockchain from the source environment;
assign an endblock value for the section designating a maximum number of the sequential blocks to be reconstructed in a target environment; and
reconstruct the section of the blockchain in the target environment.

2. The system of claim 1, wherein the data comprises multiple data types, the at least one processing device being further configured to execute the computer-readable program code to:
generate separate hashes for each of the multiple data types, wherein the data is bucketed in a block on the blockchain based on a data type of the data; and
modify a block header of the block on the blockchain to individually store the separate hashes.

3. The system of claim 1, wherein assigning the endblock value further comprises assigning a first endblock value for a first data type and a second endblock value for a second data type, wherein the section comprises reconstructed data designated by the first endblock value and the second endblock value.

4. The system of claim 1, wherein the blockchain is a first blockchain, and wherein the at least one processing device being further configured to execute the computer-readable program code to add an incremental block to the section in the target environment, the section and the incremental block forming a second blockchain.

5. The system of claim 4, wherein the at least one processing device being further configured to execute the computer-readable program code to rebroadcast the incremental block from the second blockchain in the target environment to the first blockchain in the source environment, wherein the incremental block is added as a new block to an end of the first blockchain.

6. The system of claim 5, wherein block content data is rebroadcast to the first blockchain, and wherein a new block header is generated for the new block on the first blockchain.

7. The system of claim 4, wherein the at least one processing device being further configured to execute the computer-readable program code to trim the incremental block from the second blockchain in the target environment to restore the section.

8. The system of claim 1, wherein the section is a first section, and wherein the at least one processing device being further configured to execute the computer-readable program code to:
selectively clone a second section of the blockchain from the source environment; and
reconstruct a combined third section of the blockchain, wherein the combined third section comprises the first section and the second section.

9. The system of claim 1, wherein the source environment is a production environment and the target environment is a testing, quality assurance, or product development environment.

10. A computer program product for selective data restore utilizing a blockchain architecture, wherein the computer program product comprises at least one non-transitory computer-readable medium comprising computer-readable instructions, the computer-readable instructions, when executed by at least one processing device, cause the at least one processing device to:
establish a connection to a blockchain within a source environment, the blockchain storing data and having a number of sequential blocks;
selectively clone a section of the blockchain from the source environment;
assign an endblock value for the section designating a maximum number of the sequential blocks to be reconstructed in a target environment; and
reconstruct the section of the blockchain in the target environment.

11. The computer program product of claim 10, wherein the data comprises multiple data types, and wherein the computer-readable instructions, when executed by at least one processing device, cause the at least one processing device to:
generate separate hashes for each of the multiple data types, wherein the data is bucketed in a block on the blockchain based on a data type of the data; and
modify a block header of the block on the blockchain to individually store the separate hashes.

12. The computer program product of claim 10, wherein assigning the endblock value further comprises assigning a first endblock value for a first data type and a second endblock value for a second data type, wherein the section comprises reconstructed data designated by the first endblock value and the second endblock value.

13. The computer program product of claim 10, wherein the blockchain is a first blockchain, and wherein the computer-readable instructions, when executed by at least one processing device, cause the at least one processing device to add an incremental block to the section in the target environment, the section and the incremental block forming a second blockchain.

14. The computer program product of claim 13, wherein the computer-readable instructions, when executed by at least one processing device, cause the at least one processing device to rebroadcast the incremental block from the second blockchain in the target environment to the first blockchain in the source environment, wherein the incremental block is added as a new block to an end of the first blockchain.

15. The computer program product of claim 14, wherein block content data is rebroadcast to the first blockchain, and wherein a new block header is generated for the new block on the first blockchain.

16. The computer program product of claim 13, wherein the computer-readable instructions, when executed by at least one processing device, cause the at least one processing device to trim the incremental block from the second blockchain in the target environment to restore the section.

17. The computer program product of claim 10, wherein the section is a first section, and wherein the computer-readable instructions, when executed by at least one processing device, cause the at least one processing device to:
  selectively clone a second section of the blockchain from the source environment; and
  reconstruct a combined third section of the blockchain, wherein the combined third section comprises the first section and the second section.

18. A computer-implemented method for selective data restore utilizing a blockchain architecture, the computer-implemented method comprising:
  providing a controller assigned for selectively copying and reconstructing data stored on a blockchain, the controller comprising at least one memory device with computer-readable program code stored thereon, at least one communication device connected to a network, and at least one processing device, wherein the at least one processing device is configured to execute the computer-readable program code to:
    establish a connection to a blockchain within a source environment, the blockchain storing the data and having a number of sequential blocks;
    selectively clone a section of the blockchain from the source environment;
    assigning an endblock value for the section designating a maximum number of the sequential blocks to be reconstructed in a target environment; and
    reconstruct the section of the blockchain in the target environment.

* * * * *